United States Patent [19]

Davis

[11] 4,213,896

[45] Jul. 22, 1980

[54] RENNET CASEIN AND METHOD FOR TREATMENT THEREOF

[75] Inventor: Paul F. Davis, Addison, Ill.

[73] Assignee: Kraft, Inc., Glenview, Ill.

[21] Appl. No.: 33,388

[22] Filed: Apr. 26, 1979

[51] Int. Cl.² .............................................. A23J 1/20
[52] U.S. Cl. .................................... 260/119; 426/657
[58] Field of Search ......................... 260/119; 426/657

[56] References Cited

U.S. PATENT DOCUMENTS

| | | | |
|---|---|---|---|
| 3,218,173 | 11/1965 | Loewenstein | 260/119 |
| 3,674,500 | 7/1972 | Nagasawa et al. | 260/119 |
| 4,055,555 | 10/1977 | Badertscher et al. | 260/119 |
| 4,126,607 | 11/1978 | Eastin | 260/119 |

FOREIGN PATENT DOCUMENTS 46-35507  10/1971  Japan ........................................ 260/119

Primary Examiner—Walter C. Danison
Attorney, Agent, or Firm—Fitch, Even & Tabin

[57] ABSTRACT

Rennet casein is added to water to provide a casein dispersion. An orthophosphate salt of a monovalent cation is added to the casein dispersion so as to solubilize the casein. A rennet casein product is then recovered. In a preferred embodiment, a magnesium salt is added to the casein solution and a casein product is thereafter recovered from the solution.

6 Claims, No Drawings

RENNET CASEIN AND METHOD FOR TREATMENT THEREOF

The present application is directed to a method for treatment of rennet casein to provide a casein product with desirable water binding properties. More particularly, the present invention is directed to a method for treatment of rennet casein to provide a casein product which can be combined with suitable components to provide a milk replacement for use in various food products.

Casein is a by-product of the dairy industry and is usually prepared from skim milk. There are several methods for isolating casein from cow's milk and from the milk of other mammals. The physical properties and chemical composition of casein is dependent upon the source of the casein and the method of preparation. In general, there are two principal methods for the isolation of casein from milk. These methods are the acid precipitation of casein at the isoelectric point and enzyme coagulation of casein by the action of rennin or other suitable enzyme. The present invention is specifically directed to casein derived from cow's milk by rennin coagulation of casein from cow's milk.

The enzyme, rennin, is usually obtained from the inner lining of the fourth stomach of young calves and lambs. The extract containing rennin is called rennet. During the process of rennin coagulation there is no change in pH and very little change in other physical properties except viscosity, which decreases at first and then increases rapidly as curdling proceeds. The product of coagulation with rennin contains casein in a permanently altered form, referred to as paracasein. When paracasein is redispersed, it cannot be coagulated again with rennin indicating that a permanent chemical change has occurred in the casein. The rennin coagulum from skim milk is calcium paracaseinate containing calcium phosphate. Coagulation with rennin takes place in two distinct stages, conversion of calcium caseinate into calcium paracaseinate by the action of rennin, and coagulation of calcium paracaseinate by the action of soluble salts of calcium in the milk. The transformation of calcium caseinate to calcium paracaseinate is only effected by enzymes such as rennin and rennet casein is a unique product of commerce. By the term "rennet casein" as used herein is meant any casein produced from cow's milk by the action of any enzyme which causes conversion of calcium caseinate to calcium paracaseinate during the coagulation process.

Rennet casein is a highly desirable product for use in many foods and is greatly preferred to acid precipitated casein for many uses because of the bland flavor of rennet casein. However, rennet casein has poor water holding properties and it has not been possible to use rennet casein as a replacement for non-fat milk solids in many food products requiring water holding properties. It would be desirable to provide a method for treatment of rennet casein to increase the water holding properties thereof. It would also be desirable to provide a substitute for non-fat milk solids utilizing rennet casein for use in various food products.

Accordingly, it is a principal object of the present invention to provide a method for treatment of rennet casein to provide a casein product with desirable water binding properties. It is another object of the present invention to provide a rennet casein product which can be used as a replacement for skim milk solids in various products. It is a further object of the present invention to provide a whey product in combination with rennet casein which can be used for the replacement of skim milk in various food products, including ice cream.

In general, the method of the present invention for treatment of rennet casein includes the following steps. Rennet casein is added to water to provide a casein dispersion. An orthophosphate salt of a monovalent cation is added to the casein dispersion and the casein dispersion is agitated to solubilize casein. A magnesium salt is added to the casein solution and a rennet casein product is then recovered by any suitable method, such as spray drying.

The casein product of the present invention is derived from rennet casein of cow's milk, has desirable water binding properties and is useful in a variety of products. In particular, the casein product can be combined with a whey product for use as a replacement for non-fat milk solids in food products requiring a bland flavor and good water holding properties, such as ice cream.

The rennet casein is added to the water at a level sufficient to provide from about 1 to about 22 percent by weight of rennet casein in the solution. The orthophosphate salt is added to the rennet casein dispersion and the dispersion is agitated. This generally takes from about 5 to about 20 minutes to hydrate the rennet casein and to solubilize the rennet casein and provide a casein solution. As used herein, the term "casein solution" refers to a stable dispersion of casein in an aqueous medium. It is not believed that the casein forms a true solution but is present in the form of dispersed micelles. The orthophosphate salt aids in the hydration and dispersion of the rennet casein and provides a stable dispersion of the casein micelles in the aqueous medium.

It is known to use complex phosphates to solubilize casein. Complex phosphates cannot be used in the method of the present invention since they produce casein solutions with high viscosity at the levels of casein used in the present invention. These casein solutions tend to gel at ambient temperature and require the continuous heating of the solution to maintain a fluid solution. The use of an orthophosphate salt of a monovalent cation in accordance with the present invention provides a rennet casein solution with relatively low viscosity which remains liquid at ambient temperature. Rennet casein which has been solubilized with complex phosphates is sensitive to magnesium ion. Insolubilization of casein solubilized with complex phosphates begins with the addition of small quantities of magnesium and proceeds rapidly as further quantities are added. The curd formed is not suitable for purposes of the present invention.

The preferred orthophosphate salts are monosodium phosphate, disodium phosphate, trisodium phosphate, potassium phosphate and ammonium phosphate and particularly preferred orthophosphate salts are disodium phosphate and trisodium phosphate. Monosodium phosphate tends to produce casein solutions with too low a pH which are unsuitable. The orthophosphate salt is used at a level of from about 5 to about 20 percent by weight of the rennet casein to provide a casein solution with a pH of from about 7.0 to about 7.4. Preferably, disodium phosphate is used at a level of from about 7.5 to about 15 percent.

The caseinate product can then be recovered by any suitable method such as spray drying. The caseinate product recovered from rennet casein dispersions solubilized with the orthophosphate salt have improved flavor compared to caseinates derived from acid precipitated casein. However, the water binding properties of the rennet caseinate are not adequate for many uses, such as for replacement of milk solids in ice cream. The method of the present invention utilizing magnesium ion treatment to partially destabilize a rennet casein solution provides a rennet casein with suitable flavor and water binding properties for such purposes.

After forming the casein solution by addition of an orthophosphate salt, the casein is treated by the addition of a magnesium salt. The use of a magnesium salt to treat the rennet casein results in a rennet casein product with unique properties. It is known to use other divalent cations, such as calcium, to precipitate solubilized casein. However, the use of calcium ion to precipitate casein results in a large curd which has undesirable properties and is unsuitable for use in food products in accordance with the present invention. The magnesium salt is added at a level sufficient to provide from about 0.6 to about 1.9 percent by weight of magnesium ion based on the weight of the casein. A preferred magnesium salt is magnesium chloride. Other suitable magnesium salts are magnesium acetate and magnesium lactate.

While not wishing to be bound by any theory, it is believed that the unique properties of the rennet casein product produced in accordance with the present invention is the result of ion exchange and salt balance resulting from the consecutive use of an orthophosphate salt of a monovalent cation and a magnesium salt. It is believed that the addition of an orthophosphate salt replaces the calcium and magnesium of the casein with the monovalent cation and promotes complexing of the phosphate with the casein molecule. It is further believed that the magnesium ion of the magnesium salt exchanges with the phosphate ion and with the sodium ion of para-caseinate results in partial insolubilization of the casein. While the casein is partially insolubilized the casein remains suspended and the particle size of the casein remains very small.

After addition of the magnesium ion the rennet casein product may be recovered from the solution by any suitable method or may be used in its solubilized form. A preferred method in recovering a dry product is by spray drying so that a fine particle size can be retained. While other means of drying are also suitable, such as roll drying, the casein is sometimes recovered in a flake form which must be comminuted prior to use.

The rennet casein product may be used as a direct replacement for functional protein, such as that provided by non-fat milk solids in the manufacture of various food products, such as milk products, cheese products, bakery products and puddings. It has been determined, however, that the rennet casein product of the present invention can be combined with whey solids to provide a low cost substitute for the protein in non-fat milk solids in products requiring bland tasting materials. In this connection, the rennet casein can be combined with whey to provide a product with from about 99 to about 1 percent whey solids (dry basis) and from about 1 to about 99 percent rennet casein (dry basis). The ratio of rennet casein to whey depends upon the particular product in which the product is to be used.

Dried rennet casein and dried whey can be mixed to provide a product in accordance with the invention, or the dried rennet casein and dried whey can be added separately during the preparation of food products. The whey is preferably neutralized prior to drying. The whey, prior to drying, is preferably concentrated to provide a whey concentrate having from about 35 to about 60 percent solids. Thereafter, the whey concentrate is preferably neutralized with a divalent alkaline earth cation base to a pH of from about 6.5 to about 8.9 with a suitable base. The divalent alkaline earth cation is preferably calcium or magnesium and calcium oxide or magnesium oxide is preferably used to neutralize the whey concentrate.

In a further embodiment of the present invention, the neutralized whey concentrate can be combined with treated rennet casein solution, after addition of magnesium salt, and the mixture of rennet casein solution and whey concentrate can be spray dried together. This results in an intimate admixture of the rennet casein and whey solids.

When making a whey/rennet casein product blend by wet processing, it is preferred that the divalent alkaline earth cation content of the whey should not be over about 0.85 percent. Disodium phosphate can be added to the whey concentrate prior to neutralization to reduce the activity of divalent cations present or added to the whey concentrate. The activity of the divalent alkaline earth cation content of the whey concentrate is adjusted with disodium phosphate, if required, to provide a whey concentrate having a level of divalent alkaline earth cation activity equlvalent to that of a whey concentrate containing not more than 0.85 percent divalent alkaline earth cation. If the activity of the divalent cation content of the whey concentrate is above about 0.85, excessive rennet casein curd formation can result which may result in a chalky mouth feel for critical uses, such as ice cream.

EXAMPLE I

One hundred kilograms of rennet casein is added to 400 kilograms of water which is at a temperature of 74° C. Ten kilograms of anhydrous disodium phosphate is added to the rennet casein mixture and the mixture is agitated for 15 minutes to hydrate and solubilize the rennet casein. 8.4 kilograms of magnesium chloride decahydrate are added to the solubilized casein to provide a treated rennet casein solution. Thereafter, the heated rennet casein is recovered by spray drying.

A pudding mix containing the following ingredients at the indicated levels is prepared:

| Ingredients | Weight Percent |
| --- | --- |
| Sugar | 18.9 |
| Whole eggs | 15.2 |
| Non-fat dry milk | 6.7 |
| Corn starch | 4.8 |
| Salt | .25 |
| Water | 54.15 |

Pudding is prepared using the above formulation containing the non-fat milk solids and a second formulation wherein 3 percent of the treated rennet casein described hereinabove is substituted for the non-fat milk solids. The two pudding samples are tasted by a panel of experts and no flavor variation between the two samples is detected. A third pudding formulation containing sodium caseinate from acid precipitated casein is prepared. The pudding formulation containing the treated rennet casein prepared in accordance with this example has a flavor preferred to the pudding formulation containing sodium caseinate from acid precipitated casein.

EXAMPLE II

One hundred kilograms of rennet casein is added to 400 kilograms of water which is at a temperature of 74° C. Ten kilograms of anhydrous disodium phosphate is added to the rennet casein mixture and the mixture is agitated for fifteen minutes to hydrate and solubilize the rennet casein. 8.4 kilograms of magnesium chloride decahydrate are added to the solubilized casein and agitation is continued to provide a treated rennet casein solution. The rennet casein solution is then spray dried.

Five thousand nine hundred and sixty-eight kilograms of sweet whey from cheddar cheese is concentrated to 48.5 percent solids by vacuum evaporation. The sweet whey concentrate is neutralized to pH 8 by adding 4.25 kilograms of calcium oxide. The sweet whey concentrate contains 0.81 percent divalent alkaline metal cation before calcium oxide addition. The neutralized whey concentrate is then spray dried.

An ice cream mixture containing the following ingredients at the indicated levels is prepared:

| Ingredients | Weight Percent |
|---|---|
| Cream (40% butterfat) | 25.00 |
| Condensed skim milk (30% solids) | 14.2 |
| Sweet whey (96% solids) | 4.86 |
| Liquid sugar (67% solids) | 17.91 |
| Liquid corn syrup (80% solids) | 6.25 |
| Stabilizer/emulsifier | 0.30 |
| Water | q.s. 100 |

Ice cream is prepared using the above formulation containing non-fat milk solids from condensed skim milk and sweet whey solids. Other formulations wherein 2-10% of the dried rennet casein product and 0-8% of the dried neutralized whey described hereinabove is substituted for the condensed skim milk and sweet whey prepared. Water is added to compensate if required. The ice cream samples are tasted by a panel of experts and no flavor variation between the samples can be detected.

EXAMPLE III

One hundred kilograms of rennet casein is added to 400 kilograms of water which is at a temperature of 74° C. Ten kilograms of anhydrous disodium phosphate is added to the rennet casein mixture and the mixture is agitated for fifteen minutes to hydrate and solubilize the rennet casein. 8.4 kilograms of magnesium chloride decahydrate is added to the solubilized casein and agitation is continued to provide a rennet casein solution.

Five thousand nine hundred and sixty-eight kilograms of sweet whey from cheddar cheese is concentrated to 48.5 percent solids by vacuum evaporation. The sweet whey concentrate is neutralized to pH 8 by adding 4.25 kilograms of calcium oxide. The sweet whey concentrate contains 0.81 percent divalent alkaline metal cation before calcium oxide addition.

The rennet casein solution and the sweet whey concentrate are combined and mixed. Thereafter, the mixture is heated to a temperature of 50° C. and is spray dried.

An ice cream mix in accordance with Example II is prepared.

Ice cream is prepared using the ice cream mix containing non-fat milk solids from condensed skim milk and sweet whey solids and a second formulation wherein 9.2 percent of the rennet casein/whey product described hereinabove is substituted for the condensed skim milk and sweet whey. The water is adjusted to balance the formulation. The two ice cream samples are tasted by a panel of experts and no flavor variation between the two samples can be detected.

EXAMPLE IV

A frozen yogurt dessert product was prepared to illustrate the use of treated rennet casein to replace non-fat milk solids. The yogurt formulation contained the following ingredients at the indicated levels:

| Ingredient | Weight Percent |
|---|---|
| Cream (40% butterfat) | 5.0 |
| Condensed skim milk (30% solids) | 36.7 |
| Liquid sugar (67% solids) | 13.4 |
| Liquid corn syrup (80% solids) | 12.5 |
| Stabilizer/emulsifier | .7 |
| Water | q.s. 100 |

Yogurt was prepared using the above formulation containing non-fat milk solids from condensed skim milk in accordance with the following procedure: The cream, condensed skim milk, liquid corn syrup and stabilizer/emulsifier were mixed with water and were homogenized and pasteurized. The mixture was cooled to 108° F. and a standard yogurt culture was added thereto. The mixture was fermented for several hours until the acidity reached 1.0 percent equivalent lactic acid. The liquid sugar was added to the fermented mixture and was blended by passing the mixture through an homogenizer at low pressure to break the curd which formed during the fermenting step. The mixture was cooled to 40° F. to provide a yogurt product. The yogurt was passed through an ice cream freezer to provide a frozen yogurt product having 60-80 percent overrun. The frozen yogurt product was packaged and stored in a freezer.

Other formulations wherein 2.75 percent of the dried rennet casein product and 8.25 percent of the dried neutralized whey described hereinabove in Example II were substituted for the solids provided by condensed skim milk were prepared. The frozen yogurt samples containing condensed skim milk (no rennet casein and no whey) were compared with the frozen yogurt samples containing the treated rennet casein of the invention and the sweet whey. No flavor variation between these samples was detected.

What is claimed is:
1. A method for treatment of rennet casein to provide a casein product with water binding properties comprising adding rennet casein to water to provide a casein dispersion, adding an orthophosphate salt of a monovalent cation to said dispersion, agitating said dispersion to solubilize said casein and adding a magnesium salt to said dispersion containing said rennet casein and said orthophosphate salt so as to cause partial destabilization and precipitation of said rennet casein.
2. A method in accordance with claim 1 wherein said orthophosphate salt is selected from the group consisting of monosodium phosphate, disodium phosphate, trisodium phosphate, potassium phosphate and ammonium phosphate.
3. A method in accordance with claim 1 wherein said rennet casein is added to the water at a level sufficient to provide from about 3 to about 22 percent by weight of rennet casein in the solution.

4. A method in accordance with claim 1 wherein said orthophosphate salt is added to said dispersion at a level of from about 5 to about 20 percent by weight based on the weight of the rennet casein.

5. A method in accordance with claim 1 wherein said magnesium salt is added at a level sufficient to provide from about 0.6 to about 1.9 percent by weight of magnesium ion based on the weight of said rennet casein.

6. A method in accordance with claim 1 wherein said magnesium salt is selected from the group consisting of magnesium chloride, magnesium acetate and magnesium lactate.

* * * * *